US011262986B2

(12) United States Patent
Narangodage et al.

(10) Patent No.: US 11,262,986 B2
(45) Date of Patent: Mar. 1, 2022

(54) AUTOMATIC SOFTWARE GENERATION FOR COMPUTER SYSTEMS

(71) Applicant: ASAPP, INC., New York, NY (US)

(72) Inventors: Hashan Buddhika Narangodage, Pannipitiya (LK); Punyashloka Biswal, Norwalk, CT (US); Jeffrey James Young, Hillsborough, NJ (US); Nicolas Antomarioni, Ciudad Autonoma de Buenos Aires (AR); Geoffrey Kendall Abbott, Bloomfield, NJ (US); Satchuthananthavale Rasiah Kuhan Branavan, London (GB); Michael Hoa Thai, Astoria, NY (US)

(73) Assignee: ASAPP, INC., New York, NY (US)

( * ) Notice: Subject to any disclaimer, the term of this patent is extended or adjusted under 35 U.S.C. 154(b) by 0 days.

(21) Appl. No.: 16/457,210

(22) Filed: Jun. 28, 2019

(65) Prior Publication Data
US 2020/0409670 A1 Dec. 31, 2020

(51) Int. Cl.
*G06F 8/36* (2018.01)
*G06N 3/08* (2006.01)
(Continued)

(52) U.S. Cl.
CPC .............. *G06F 8/36* (2013.01); *G06F 8/33* (2013.01); *G06F 16/00* (2019.01);
(Continued)

(58) Field of Classification Search
CPC ..... G06F 8/30; G06F 8/33; G06F 8/34; G06F 8/36; G06N 3/08; G06Q 30/016
(Continued)

(56) References Cited

U.S. PATENT DOCUMENTS 6,389,376 B1 * 5/2002 Lam ..................... G06F 30/30
 703/2
8,108,223 B2 * 1/2012 Willoughby ........... G06Q 10/08
 705/330

(Continued)

OTHER PUBLICATIONS

Lappas, T., et al., Finding a Team of Experts in Social Networks, KDD '09: Proceedings of the 15th ACM SIGKDD international conference on Knowledge discovery and data mining, Jun. 2009, pp. 467-476, [retrieved on Oct. 28, 2021], Retrieved from the Internet: <URL:http://dl.acm.org/>.*

(Continued)

*Primary Examiner* — Geoffrey R St Leger
(74) *Attorney, Agent, or Firm* — GTC Law Group PC & Affiliates

(57) ABSTRACT

Software for a computer system may be automatically generated to reduce costs. Software may be automatically generated using a set of software components where each component may have one or more input properties and one or more output properties. A property may correspond to a type of data (e.g., a customer ID) used by the computer system. A graph may be created from the components where the graph includes component nodes for the components and property nodes for the input and output properties. To automatically generate software for a task, a task specification may be received that includes a task input property and a task output property. A path on the graph may be determined from the task input property and the task output property, and software for accomplishing the task may be generated using components on the path. The software may then be executed or stored for later execution.

21 Claims, 9 Drawing Sheets

(51) Int. Cl.
*G06Q 30/00* (2012.01)
*G06F 8/33* (2018.01)
*G06Q 10/04* (2012.01)
*G06F 16/00* (2019.01)
*G06Q 10/10* (2012.01)
*G06F 16/901* (2019.01)

(52) U.S. Cl.
CPC .......... *G06F 16/9024* (2019.01); *G06N 3/08* (2013.01); *G06Q 10/047* (2013.01); *G06Q 10/103* (2013.01); *G06Q 30/016* (2013.01)

(58) Field of Classification Search
USPC ....... 717/106, 109, 110, 113, 132, 133, 151, 717/156, 157
See application file for complete search history.

(56) References Cited

U.S. PATENT DOCUMENTS

| | | | | |
|---|---|---|---|---|
| 8,209,238 | B2* | 6/2012 | Hughes | G06F 30/00 705/26.5 |
| 8,271,998 | B2* | 9/2012 | Dettori | G06F 8/24 709/201 |
| 8,463,633 | B2* | 6/2013 | Jung | G06Q 10/103 705/7.11 |
| 10,521,738 | B2* | 12/2019 | Simo | G06Q 10/06 |
| 10,635,789 | B1* | 4/2020 | Golden | H04L 67/16 |
| 2004/0122690 | A1* | 6/2004 | Willoughby | G06Q 30/02 705/337 |
| 2008/0271008 | A1* | 10/2008 | Dettori | G06F 8/24 717/168 |
| 2010/0058262 | A1* | 3/2010 | Morizawa | G06F 30/20 716/106 |
| 2010/0262471 | A1* | 10/2010 | Hughes | G06Q 10/063 705/7.29 |
| 2013/0030859 | A1* | 1/2013 | Jung | G06Q 10/06 705/7.26 |
| 2014/0150115 | A1* | 5/2014 | Ciudad | G06F 21/10 726/28 |
| 2017/0351401 | A1* | 12/2017 | Pascale | G06F 16/248 |
| 2018/0152506 | A1* | 5/2018 | Simo | G06Q 10/101 |
| 2019/0107410 | A1* | 4/2019 | Chakraborty | G06F 16/9024 |

OTHER PUBLICATIONS

Behi, et al., "Software Development with Automatic Code Generation: Observations from Novice Developer Viewpoint", Proceedings of the International Conference on Software Engineering Research and Practice & Conference on Programming Languages and Compilers, SERP 2006, Las Vegas, Nevada, USA, vol. 1, Jun. 26-29, 2006, 8 pages.

Ed-Douibi, et al., "APIComposer: Data-driven Composition of REST APIs", Service-Oriented and Cloud Computing. ESOCC 2018. Lecture Notes in Computer Science, Kritikos K., Plebani P., de Paoli F. (eds), vol. 11116. Springer, Cham, 2018, pp. 161-169.

Rosales-Morales, et al., "An analysis of tools for automatic software development and automatic code generation", Revista Facultad de Ingenierfa, Universidad de Antioquia, No. 77, 2015 (accessed on Jan. 3, 2017), pp. 75-87.

Serrano, et al., "Linked REST APIs: A Middleware for Semantic Rest API Integration", IEEE 24th International Conference on Web Services, 2017, pp. 138-145.

* cited by examiner

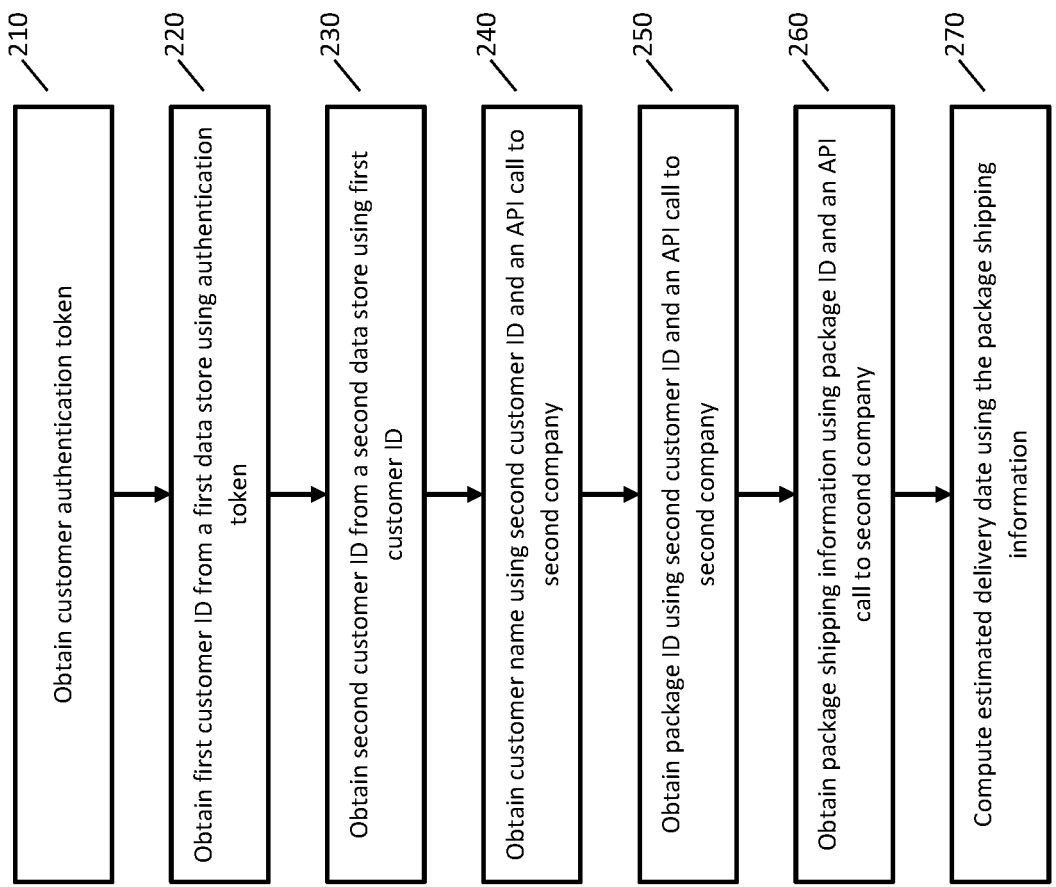

| Properties |
|---|
| AuthenticationToken |
| FirstCustomerID |
| SecondCustomerID |
| CustomerName |
| CustomerAddress |
| PackageID |
| PackageShippingInfo |
| PackageDeliveryEstimate |
| ... |

Fig. 4

| Component ID | Inputs | Outputs | Implementation |
|---|---|---|---|
| cmp100 | [AuthenticationToken] | [FirstCustomerID] | function GetFirstIDFromToken |
| cmp101 | [FirstCustomerID] | [SecondCustomerID] | function GetSecondIDFromFirstID |
| cmp102 | [SecondCustomerID] | [CustomerName, CustomerAddress] | function RequestCustomerInfo |
| cmp103 | [SecondCustomerID] | [PackageID] | function RequestPackageID |
| cmp104 | [PackageID] | [PackageShippingInfo] | function RequestPackageShippingInfo |
| cmp105 | [PackageShippingInfo] | [PackageShippingInfoFedEx, PackageShippingInfoUPS] | function ShipperSelector |
| cmp106 | [PackageShippingInfoFedEx] | [PackageDeliveryEstimate] | function RequestEstimateFedEx |
| cmp107 | [PackageShippingInfo, CustomerAddress] | [PackageDeliveryEstimate] | function ComputeDeliveryEstimate |
| ... | | | |

Fig. 5

```
001: def {{ task.name }}({{{task.input_property}}}):
002: {% for component in components %}
003:     {{ component.output_property }} =
           {{ component.function }}({{ component.input_property }})
004:
005: {% endfor %}
006:     return {{ task.output_property }}
```

Fig. 7

```
def CustomerNameFromToken(token):
    firstCustomerID = GetFirstIDFromToken(token)
    secondCustomerID = GetSecondIDFromFirstID(firstCustomerID)
    customerName, customerAddress = RequestCustomerInfo(secondCustomerID)
    return customerName
```

Fig. 8A

```
def PackageDeliveryEstimateFromToken(token):
    firstCustomerID = GetFirstIDFromToken(token)
    secondCustomerID = GetSecondIDFromFirstID(firstCustomerID)
    packageID = RequestPackageID(secondCustomerID)
    packageShippingInfo = RequestPackageShippingInfo(packageID)
    customerAddress, customerName = RequestCustomerInfo(secondCustomerID)
    packageDeliveryEstimate = ComputeDeliveryEstimate(packageShippingInfo, customerAddress)
    return packageDeliveryEstimate
```

Fig. 8B

AUTOMATIC SOFTWARE GENERATION FOR COMPUTER SYSTEMS

BACKGROUND

Modern computer systems, such as those for software as a service or SAAS, may be complex in that a software developer writing software for those systems may need to understand the operation of many interdependent parts. The complexity of the computer systems may increase the amount of time needed to implement new functionality or update existing functionality. Additionally, the complexity of the computer systems may increase the likelihood of software bugs or a failure when a first part of the system is changed and a second part of the system has not been updated to operate with the changed functionality of the first part.

For example, a database that stores customer names may be updated so that the interface for retrieving a customer name from the database is changed. Other software in the computer system that uses customer names may need to be revised to work with the updated database. Because customer names may be used in many areas of a computer system, much work may be required to update the computer system. Further, where a part of the computer system is inadvertently not updated, bugs may be introduced.

Accordingly, improving the software development process for computer systems may reduce software development costs and also increase the reliability of computer systems.

BRIEF DESCRIPTION OF THE FIGURES

The invention and the following detailed description of certain embodiments thereof may be understood by reference to the following figures:

FIG. 1 is an example template or code portion that may be used to present information on a website.

FIG. 2 is a flowchart of an example method that a software developer may use to obtain values of template variables for a computer system.

FIG. 4 is an example list of properties that may be used in a computer system.

FIG. 5 is an example list of components that may be used in a computer system.

FIG. 7 is an example template that may be used to generate executable software for a path of a graph.

FIGS. 8A and 8B are examples of executable software generated by a template.

DETAILED DESCRIPTION

Figure 3:
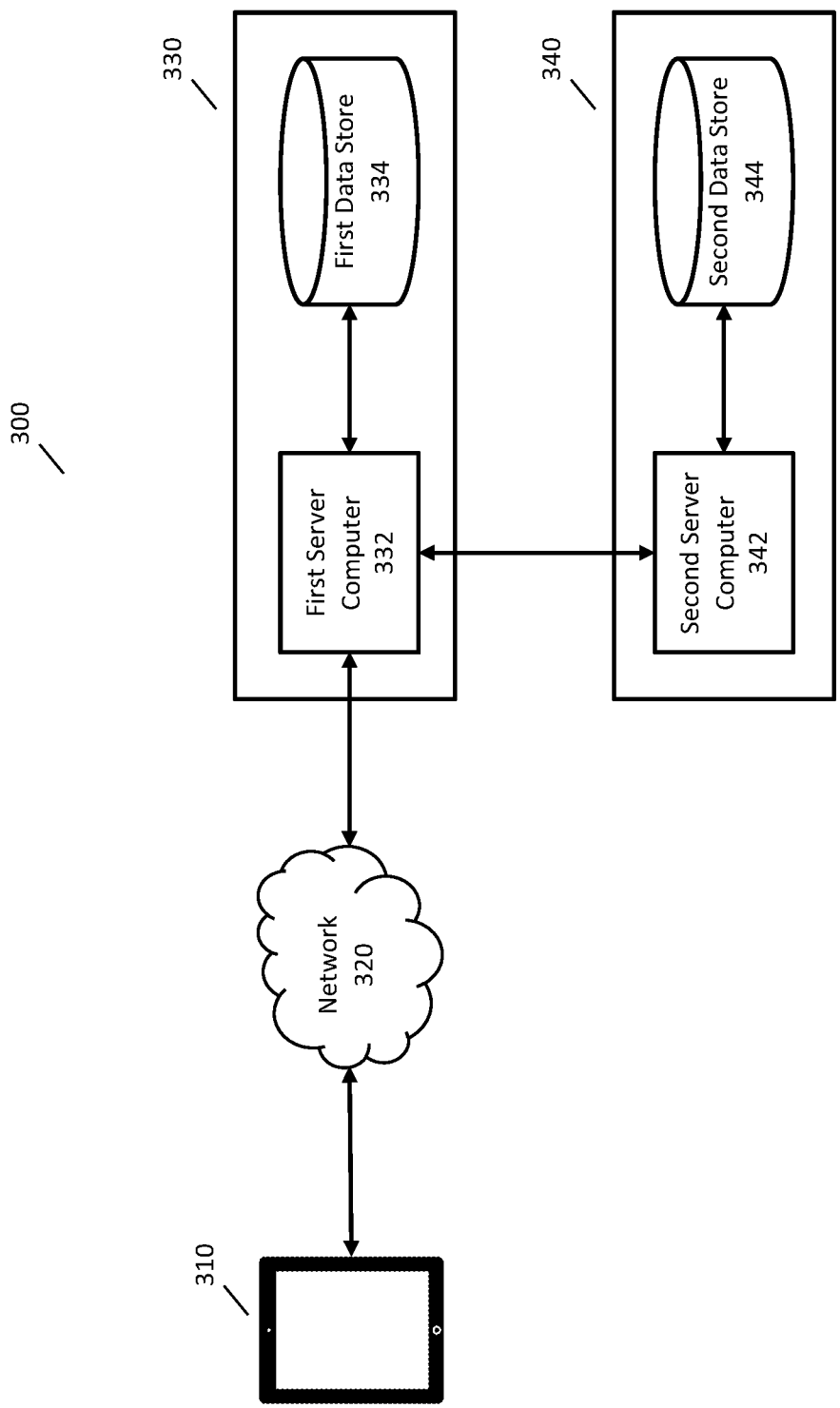
FIG. 3 is an example computer system where a first company may provide a web page to a customer using services of a second company.

Computer systems may have many different parts that work together to provide desired functionality, such multiple servers, multiple databases, and multiple disks for storing files and other data. Further, the different parts may be managed by different business units of an organization. Further, data stored in different locations may use different database formats (e.g., SQL versus NoSQL) and may use different programming libraries (possibly written in different programming languages) for accessing the data from the databases.

In some implementations, the operation of a computer system may depend on functionality of other computer systems. For example, one company may use the services of another company and the computer systems of each company may need to interact with each other to provide the desired services.

Computers may interact with each other using an application program interface (API). A company may create an API that allows other companies to access services and data of the company. For example, a company that delivers packages may create an API that allows other companies to obtain shipping information for a package (e.g., the date it was shipped, the shipping address, or its current location) or obtain an estimated delivery date for the package. If a company changes its API, then other companies that use this API may need to update their own computer systems so that they operate correctly with the updated API.

A software developer writing software for a computer system may accordingly need to understand a large volume of information in order to be able to implement desired functionality. Writing such software may take considerable time and effort. Further, when a part of a computer system changes (such as an API of another company), the software developer may be need to spend additional time to update the software to work with the changed API.

Software for computer systems may be written for a wide variety of applications, such as software as a service (SAAS) that may be used by companies and individuals. Although the techniques described herein may be used with any type of computer system and any type of software, for clarity of presentation, a computer system for presenting information on a website will be used as an example computer system. One example of such a website is a website that is used to provide customer support or customer service to customers of a company.

FIG. 1 is an example template or code portion that may be used to present information on a website. FIG. 1 includes text that may be presented to a user and variables that may be replaced by information that is specific to an individual user. For example, "${CustomerName}" may be replaced by the name of the customer, and "${PackageDeliveryEstimate}" may be replaced by a date corresponding to an estimated delivery of a package. A computing system may include one or more such templates for generating web pages and may include software that replaces the variables of the templates with the information to be presented to the users accessing the web pages.

A software developer may need to write software to obtain the needed information for presentation to a customer. For example, the text of FIG. 1 may be included in a template, and the software developer may write software to obtain the values for the variables of the template so that the template may be rendered and presented to a customer.

FIG. 2 is a flowchart of an example method that a software developer of a first company may use to obtain values of the template variables. To implement such a method, the software developer first determines the steps for accomplishing the goal (e.g., a customer name and package delivery estimate) from the data that is currently available to the software developer. After determining what the steps are, the software developer then determines how to implement each of the steps.

At step 210, an authentication token may be obtained for the customer. For example, the customer may login with a username and a password. The developer would write software to obtain the username and password from the customer and then verify the username and password to obtain the authentication token.

At step 220, a first customer identifier (ID) is obtained from a first data store using the authentication token. The first customer ID may be used by the first company to facilitate accessing the data of the customer. To write software to implement this step, the developer determines the database where the first customer ID is stored and know how to submit a database query to obtain the first customer ID using the authentication token.

At step 230, a second customer ID is obtained from a second data store using the first customer ID. For example, the first company may be working with or partnering with a second company to provide services to the customer. For an individual customer, the first customer ID used by the first company may be different from the second customer ID used by the second company, even though the two IDs refer to the same customer. Some databases and API calls may use the first customer ID and some databases and API calls may use the second customer ID. To write software to implement this step, the developer determines the database where the second customer ID is stored and how to submit a database query to obtain the second customer ID using the first customer ID.

At step 240, a customer name is obtained by using an API call to a server operated by a second company using the second customer ID. To write software to implement this step, the developer determines that the second company provides the customer name, that the way to obtain the customer name is through an API call, and how to implement the API call.

At step 250, a package ID is obtained by using an API call to a server operated by the second company using the second customer ID. To write software to implement this step, the developer determines similar information as set forth in step 240.

At step 260, package shipping information is obtained by using an API call to a server operated by the second company using the second customer ID. To write software to implement this step, the developer determines similar information as set forth in step 240.

At step 270, an estimated delivery date is computed using the package shipping information. To implement this step, the developer determines how to compute an estimated delivery date, how to obtain the software library that performs the computations, and the data that is required for performing the computation.

After completing the steps of FIG. 2, the developer has obtained the customer name and the package delivery estimate to present to the customer on a specific web page. For other web pages that the developer implements, the developer may perform a similar sequence of steps to obtain the needed information. Where steps of the process change (e.g., the second company changes an API), the developer may need to make many software changes to keep the website working correctly.

The techniques described herein allow for the automatic generation of executable software to reduce the burden on companies and developers. To automatically generate software to perform a task, a task specification may be created that indicates the available information (e.g., an authentication token) and the desired information (e.g., a customer name), and executable software may be automatically generated using the task specification. Where a component of the processing changes (e.g., an API of the second company), the executable software may be regenerated to accommodate the changed component.

FIG. 3 is an example computer system 300 where a first company may provide a web page to a customer using services or data of a second company. In FIG. 3, customer 310 may use a device to access a web page provided by first company across network 320. First company 330 receives the request for the web page and performs processing, such as the processing of FIG. 2, to present the web page to the customer. First company 330 may have a first server computer 332 that may perform any appropriate actions for presenting the web page to customer.

The processing to present the web page may include accessing data in first data store 334, such as through a database query. The processing to present the web page may also include requesting information from second company 340, such as by making an API call to second server computer 342 of second company 340. To respond to the API call, second company 340 may access data in second data store 344, such as through a database query. First company 330 may then use the information from its own datastores (e.g. first data store 334) and from API calls to second company 340 (e.g. from second data store 344) to generate the web page and transmit the web page to customer 310.

FIG. 3 is a simplified example of a computer system and each of first company 330 and second company 340 may have many different server computers for implementing different functionality and many different data stores for storing different kinds of information. The techniques described herein are not limited to the example of FIG. 3. For example, in some implementations of the techniques described herein, a company may generate executable software for providing services to another company and may not provide a web page or any other information to an individual customer.

One difficulty with computer systems is that a piece of information, such as a customer name, may be referred to differently in different parts of the computer system. Software that processes a customer name may have a variable or a function parameter or argument that stores a customer name. Different portions of software, however, may use different variable names for the customer name. For example, a first portion of software may use custName and a second portion of software may use customer_name. One or more databases may store a customer name, and different databases may use different field names to store a customer name. One or more API calls may transmit or receive a customer name, and different API calls may identify a customer name in different ways.

To facilitate automatic generation of software, an identifier may be created for each type of information that is processed by a computer system. An identifier for a type of information is referred to herein as a property. A property may be created for each type of information that is used by the computer system, and a list of properties may be provided to developers so that developers know how to refer to different types of information. For example, the developer writing the template of FIG. 1, may use the property CustomerName to indicate that the customer's name should be inserted at that portion of the template. This allows the developer to obtain the customer's name regardless of the variable or field names that are used to store the customer's name in different parts of the computer system.

FIG. 4 is an example list of properties that may be used in a computer system. In practice, especially for complicated computer systems, the number of properties may be large, such as hundreds or thousands of properties. In some implementations, properties may be hierarchical. For example, a Customer property include multiple properties of a customer, such as a FirstName property, a LastName property, a PhoneNumber property etc. A developer may access a hierarchical property, for example, as Customer.LastName.

For any given software development task, the developer may have access to certain properties (or may not have any properties at all) and may need to obtain values of other properties. For example, for the processing of FIG. 2, a developer may have an authentication token and need the CustomerName property and the PackageDeliveryEstimate property.

To facilitate automation of providing properties to a developer, software components may be created that process input properties to provide output properties. For example, components may be created for some or all of the steps of FIG. 2, such as a component that receives a property corresponding to a first customer identifier and outputs a property corresponding to a second customer identifier. Such components may then be chained together to provide desired outputs using available inputs.

A variety of components may be created, and the following are examples of types of components that may be created: a component that retrieves information from a database using a database query, a component performs an API call to a server (either a local server or a remote server), a component that performs a computation (e.g., processing data using a neural network), or a component that implements flow control logic, such as any flow control logic that may appear in a programming language (e.g., loops, if-then-else statements, or switch or case statements).

FIG. 5 is an example list of components that may be used in a computer system. For example, FIG. 5 may be a table of a database where each row of the table corresponds to a component. A list of components may include any appropriate information. For example, each component may have an identifier or name, one or more properties received as inputs, one or more properties that are produced as outputs, and a reference to a software implementation of the component, such as a function name.

In the example of FIG. 5, the first component processes an AuthenticationToken property of a customer and provides a FirstCustomerID for the customer. The second component processes a FirstCustomerID property of the customer (e.g., an identifier used by a first company) and provides a SecondCustomerID for the customer (e.g., an identifier used by a second company for the same customer). Similarly, the other components shown in FIG. 5 may provide processing similar to steps of FIG. 2.

In some implementations, the implementations of each component may not use or access any properties other than the one or more input properties and the one or more output properties. For example, instead of making a component to process an AuthenticationToken property to produce a SecondCustomerID property (which would internally use the FirstCustomerID property), two components would be created: a first component to process the AuthenticationToken property to produce the FirstCustomerID property and a second component to process the FirstCustomerID property and produce the Second CustomerID property. Implementing components in such a manner may increase code reuse and reduce the burden of maintaining software components when implementation details of the underlying computer system are changed.

A list of components may be created to allow developers to perform all tasks needed in the operation of a computer system. For example, for the task of presenting a CustomerName property and a PackageDeliveryEstimate property from an AuthenticationToken property, the components shown in FIG. 5 may be created along with other components that are used for other tasks.

Each component may be implemented using any appropriate techniques. For example, each component may be implemented using a programming language (either interpreted or compiled) that receives the input properties as arguments and does processing sufficient to return the output properties. For example, a component may implement a database query, an API call, or perform computations.

A graph, such as a directed graph, may be created using the components to facilitate use of the components to automatically generate software. For example, a graph may have a node for each property of the computing system and a node for each component of the computing system. The graph may include edges indicating the inputs and outputs of each component. For example, an edge may have a direction, and an edge from a property to a component may indicate that the property is an input to the component and an edge from the component to a property may indicate that the property is an output of the component.

Figure 6A:
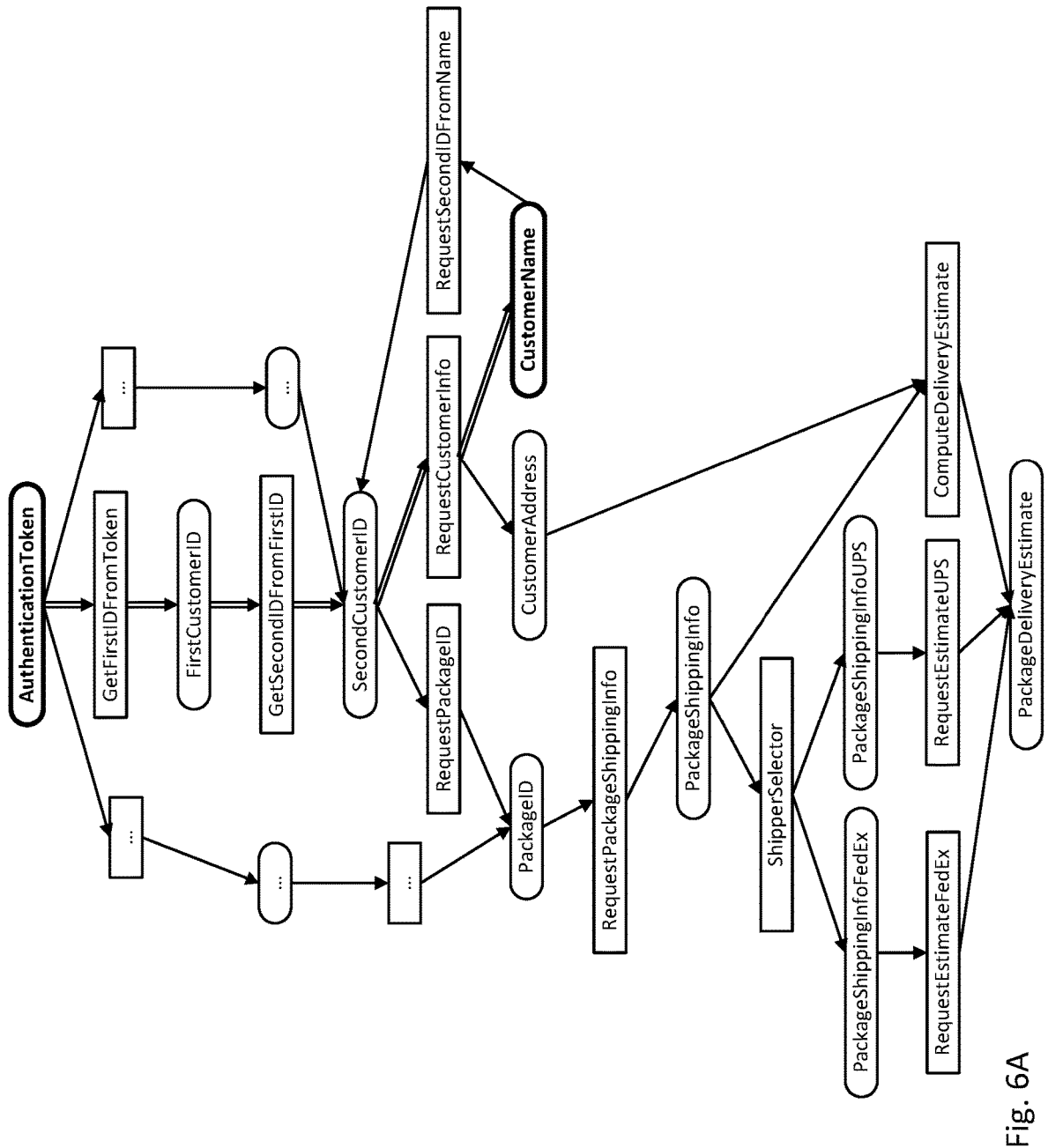
FIGS. 6A and 6B are example graphs of properties and components that may be used to generate executable software.

FIG. 6A is an example graph of properties and components that may be used to generate executable software. In the example of FIG. 6A, the nodes corresponding to properties are represented by rounded rectangles and the nodes corresponding to components are represented by regular rectangles. The directed edges between nodes indicate the inputs and outputs of each component. In FIG. 6A, property nodes include text for the name of the property and component nodes include text for a name of a function that may implement the component. Additional nodes are presented with ellipses to indicate that other nodes and paths through the graph are possible. In practice, such a graph may have a large number of nodes and be significantly larger and more complex than the example of FIG. 6A.

The graph of FIG. 6A may indicate how to obtain an output property given an input property. For example, suppose a developer has an AuthenticationToken property (which is bolded in FIG. 6A) and needs a CustomerName property (also bolded in FIG. 6A). A path exists in the graph between the AuthenticationToken property and the CustomerName property, and this path is highlighted with double arrows. Performing the processing for each component along this path allows the developer to obtain the CustomerName property from the AuthenticationToken property.

Figure 6B:
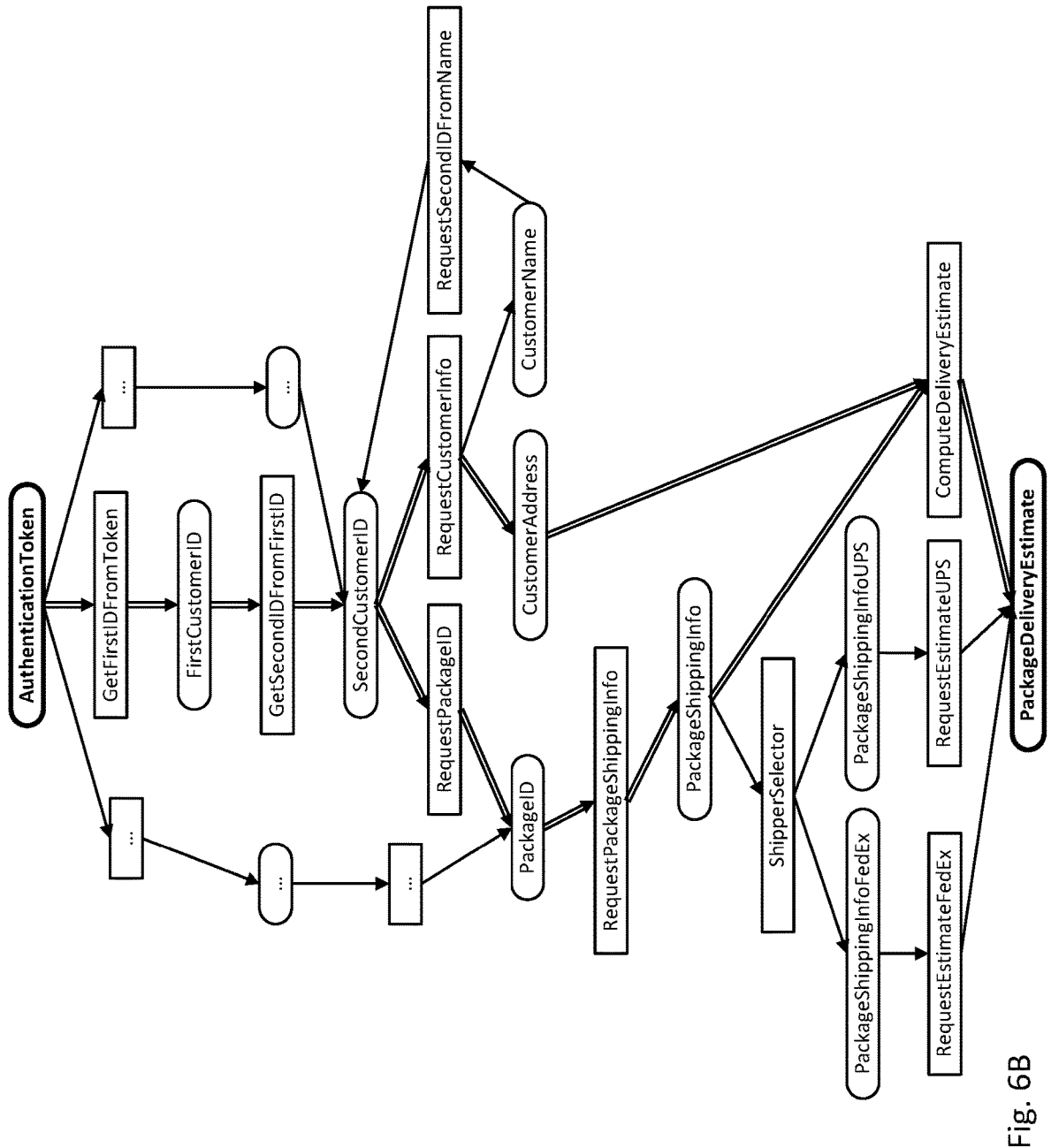

FIG. 6B is another example graph of properties and components that may be used to generate executable software, but in FIG. 6B, a path is highlighted to obtain a PackageDeliveryEstimate property from the AuthenticationToken property.

A graph of properties and components may have more than one path from an input property to an output property. For example, the highlighted path of FIG. 6B obtains the PackageDeliveryEstimate property using the ComputeDeliveryEstimate component. The ComputeDeliveryEstimate component may compute an estimated package delivery date, for example, using the customer's address and the date and location from where the package was shipped (that may be included in the PackageShippingInfo property).

Instead of using the ComputeDeliveryEstimate component, however, a PackageDeliveryEstimate may be obtained by using an API call to the shipper of the package (e.g., FedEx or UPS). The PackageShippingInfo property may indicate the shipper of the package, and this information may be used to perform an API call to a server of the shipper to obtain the PackageDeliveryEstimate. For example, a ShipperSelector component may process the PackageShippingInfo property to route processing to a component corresponding to an API call of the shipper. For example, the ShipperSelector component may output a PackageShippingInfoFedEx property where the shipper is FedEx and a PackageShippingInfoUPS property where the shipper is UPS. Processing may then proceed to the component that uses an API call to request a package delivery estimate (e.g., RequestEstimateFedEx or RequestEstimateUPS).

Because the graph includes more than one path to obtain the PackageDeliveryEstimate property, other techniques may be used to select the path to be used in any given instance of requesting the PackageDeliveryEstimate property. For example, the RequestDeliveryEstimate component may provide a more accurate estimate than the estimate provided by the ComputeDeliveryEstimate component. On the other hand, the RequestDeliveryEstimate component may be slower, may be more expensive (the shipping company may charge a fee on an API call basis), or may be less reliable (e.g., the server responding to the API call may not be reliable). Accordingly, the path may be selected according to the needs or preferences of the software developer. Where the developer would like the most accurate estimate, the path with the RequestDeliveryEstimate component may be selected, and where the developer would like the estimate in the shortest amount of time, the path with the ComputeDeliveryEstimate component may be selected.

A graph of properties and components may also include cycles. For example, the graph includes a cycle from the SecondCustomerID property to the RequestcustomerInfo component to the CustomerName property to the RequestSecondIDFromName component and back to the SecondCustomerID component. When selecting a path through a graph, processing may be implemented to prevent the path from including a cycle.

Accordingly, given a first property node (e.g., corresponding to a property available to a developer) and a second property node (e.g., corresponding to a property needed by the developer), techniques are needed for selecting a path between the first property node and the second property node of the graph.

In some implementations, nodes or edges of the graph may be associated with one or more costs. For example, a cost for processing performed by a component may be associated with any of the component node, an edge going towards the component node, or an edge leaving the component node. Multiple costs may be used. For example, the processing of a component may have a first cost corresponding to an amount of time for the processing, a second cost corresponding to accuracy, and a third cost corresponding to monetary costs (e.g., costs of computation or using an external resource). In selecting a path, a specification may be received that indicates which cost to minimize or a combination of costs to minimize (e.g., where a weight is provided for each type of cost).

In some implementations, a shortest path algorithm may be used to select a path from a first property node to a second property node. Any appropriate techniques may be used to determine a shortest path, such as any of the Dijkstra's, Bellman-Ford, A* search, Floyd-Warshall, Johnson's, or Viterbi algorithms.

In some implementations, constrained optimization techniques may be used to select a path from a first property node to a second property node. For example, the path selection may be formulated as a Steiner tree problem and optimization techniques may be used to solve the Steiner tree problem. Any appropriate optimization techniques may be used, such integer programming or dynamic programming.

In some implementations, more than one technique may be used to select a path from a first property node to a second property node, and other considerations may be used to select among the paths returned by the different techniques. For example, a first technique may be to select a path using a shortest path algorithm and a second technique may be to select a path using constrained optimization. Although the second technique may generally provide better paths than the first technique (e.g., with a lower cost), the second technique may also be more computationally intensive and require more time to select a path. In some implementations, both techniques may be used and the path selected by the second technique may be used if the second techniques returns a path within a threshold amount of time, and otherwise, the path returned by the first technique may be used.

In some implementations, a selected path may include multiple branches, and the branch of the path to be used may be determined when the software is executed. For example, executable software for providing a PackageDeliveryEstimate property may include branches that compute the PackageDeliveryEstimate property and also include branches that obtain the PackageDeliveryEstimate property by performing an API call to the shipper. A variety of criteria may be used at runtime to select a branch at runtime, such as one or more of the following: a request for the PackageDeliveryEstimate property may specify whether it should be computed or requested from the shipper; a request for the PackageDeliveryEstimate property may specify a cost to optimize (e.g., highest accuracy) and a path may be selected according to the cost; a branch may be selected using dynamically varying costs (e.g., a current wait time for a customer service representative, availability of computing resources, or availability of another limited resource); or a first branch may be preferred but a second branch may be used if the first branch returns an error or does not complete processing within a specified amount of time (e.g., an API call may be used to request the PackageDeliveryEstimate property from the shipper, but if the API call fails or takes too long, then the PackageDeliveryEstimate property may be computed).

After a path is selected, executable software may be generated to provide a value for the second property by processing a value for the first property. Any appropriate techniques may be used to generate executable software from the selected path. In some implementations, a template may be used to generate the executable software from the path.

FIG. 7 is an example template that may be used to generate executable software for a path. The executable software may be created for a particular task, such as a task where an AuthenticationToken property is available and a CustomerName property is needed. A task may have a name, such as an easy to remember name for a software developer or a function name that corresponds to the task. A task may have one or more input properties corresponding to the properties that are available to the developer, and a task may have one or more output properties corresponding to the properties that are needed by the developer.

Using the techniques described herein, a path may be selected from the one or more task input properties to the one or more task output properties. This path may include one or more components, where each component has one or more input properties and one or more output properties. Because some components may depend on other components, the components may be ordered in a list such that each component only depends on components that are earlier in the list. Any appropriate techniques may be used to order the components.

In the example template of FIG. 7, for clarity of presentation, the task has one input property and one output property, and each component also has one input property and one output property. The extension of the template of FIG. 7, to multiple input and output properties, however, is straightforward to one of skill in the art.

In the example of FIG. 7, the template uses the notation "{{"and"}}" to replace variables with their corresponding values and the notation "{%" and "%}" for flow control such as for loops. In FIG. 7, the first line of the template defines a function call corresponding to the task. The name of the function is represented by task.name and the function takes an argument represented by task.input_property. The second line starts a loop over the components of the path where the components have already been ordered as described above. The third line represents the output of a component. The fourth line represents a function call for a component and the input argument of the component. The fifth line ends the loop over the components. The sixth line returns the output property of the task.

FIGS. 8A and 8B represent examples of software generated by a template that is similar to the template of FIG. 7 (where it has been extended to handle more than one input and output properties for a component.) FIG. 8A represents software for the highlighted path of FIG. 6A, and FIG. 8B represents software for the highlighted path of FIG. 6B. Where the programming language of the software is an interpreted programming language, the software of FIGS. 8A and 8B may be directly executed (possibly using byte compilation or similar steps). Where the programming language of the software is a compiled programming language, the software of FIGS. 8A and 8B may be compiled and then executed.

Figure 9:
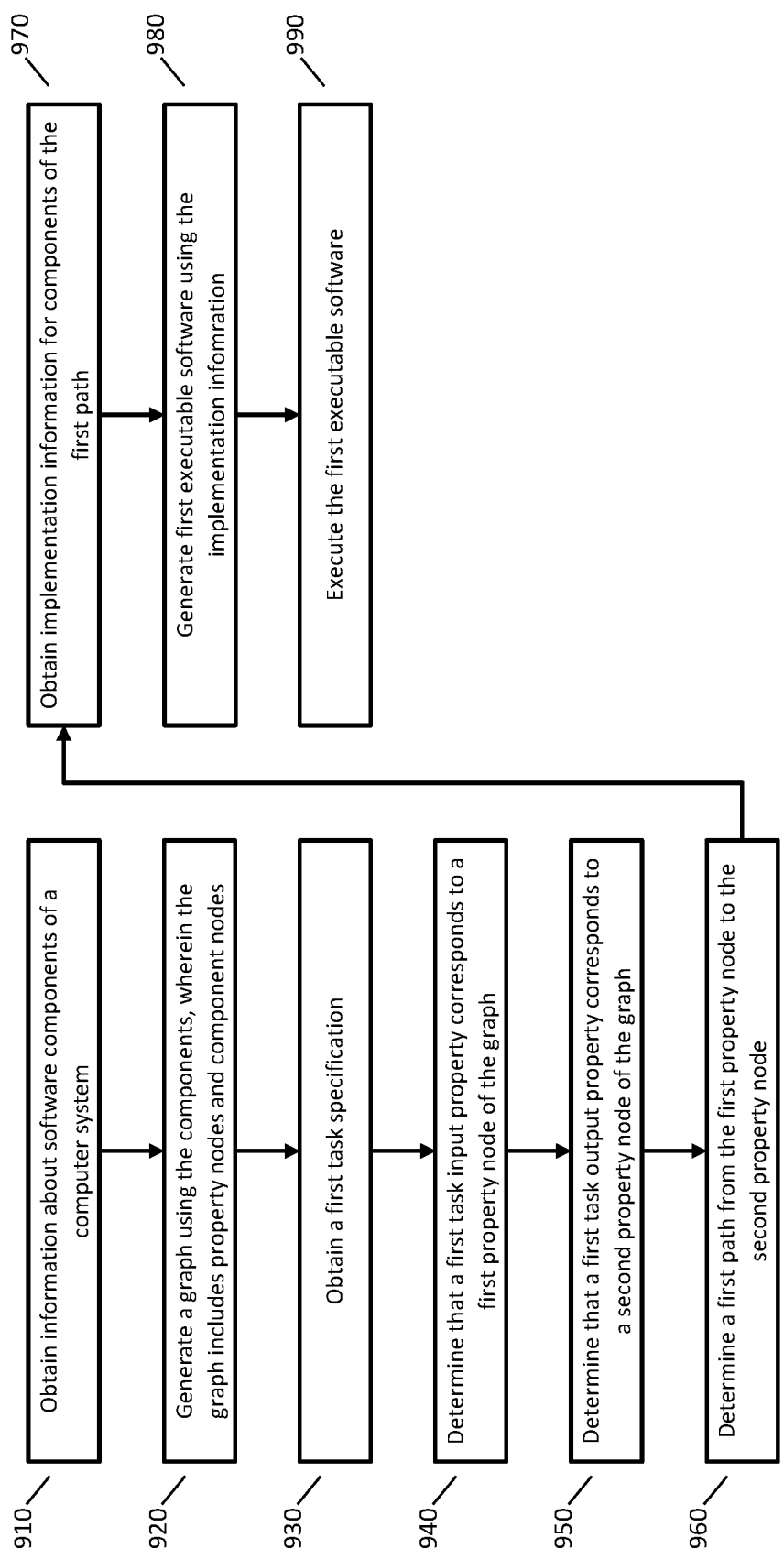
FIG. 9 is a flowchart of an example method for generating executable software using a graph.

FIG. 9 is a flowchart of an example method for generating executable software using a graph. In FIG. 9, the ordering of the steps is exemplary and other orders are possible, not all steps are required, steps may be combined (in whole or part) or sub-divided, and other steps may be added. The method described by FIG. 9 may be implemented, for example, by any of the computers or systems described herein.

At step 910, information is obtained about software components of a computer system. The components may be created and implemented using any of the techniques described herein. For example, each component may receive one or properties as input and return one or more properties as output. The components may be written using any appropriate programming language. The components may implement any appropriate functionality, such as retrieving data from a database; implementing an API call to a different computer or computer system to obtain a response from the API call; performing computations, such as processing data with a machine learning model or a neural network; or implementing flow control.

A list of components may be created using any appropriate techniques. For example, people familiar with the computing system may create a list of components corresponding to anticipated functionality. As additional functionality is needed, additional components may be created. In some implementations, a list of components may be created from task specifications. For example, a task specification for a task may indicate one or more properties that are available and one or more properties that are needed. A list of components may then be created that is sufficient to accomplish all of the tasks.

In some implementations, a component may include generating a user interface to present information to a user and receive information back from a user. For example, where an authentication token is needed, a component may cause a login screen to be presented to a user, receive a username and password from the user, and generate the authentication token from the username and password.

At step 920, a graph is generated using the components. Any appropriate techniques may be used to generate the graph. The graph may include property nodes corresponding to properties of a computing system and may include component nodes corresponding to components of a computing system. In some implementations, the graph may include directed edges to indicate the inputs and outputs of each component. In some implementations, there may be a one-to-one correspondence between components and component nodes of the graph, or a one-to-one correspondence between properties and property nodes of the graph At step 930, a first task specification is received. The task specification may correspond to any task that is performed by a computing system, such as any of the tasks described herein. The task specification may include one or more input properties corresponding to properties that are available to complete the task and one or more output properties corresponding to the goals of the task. In some instances, a task specification may not have any input properties.

At step 940, it is determined that a first task input property corresponds to a first property node of the graph. Any appropriate techniques may be used, such as by matching a name or identifier of the property. Where the first task specification includes multiple task input properties, each task input property may be mapped or matched to a property node of the graph.

At step 950, it is determined that a first task output property corresponds to a second property node of the graph. Any appropriate techniques may be used, such as by matching a name or identifier of the property. Where the first task specification includes multiple task output properties, each task output property may be mapped or matched to a property node of the graph.

At step 960, a path is determined from the first property node of the graph to the second property node of the graph. Any appropriate techniques may be used to determine the path, such as any of the techniques described herein. Where the first task specification includes multiple task input properties or multiple task output properties, the path may be connected to each of the task input and output properties. Accordingly, a path may include multiple branches. As used herein, a path includes a subgraph of a graph, where a subgraph of a graph is a connected subset of the nodes and edges of the graph.

In some implementations, the determination of a path may include evaluating costs of nodes or edges of the path. Any node or edge may have a cost or multiple costs corresponding to different criteria or objectives (e.g., minimizing monetary cost, minimizing time, etc.). A path may be selected to minimize the cumulative costs of all nodes and edges along the path.

In some implementations, the determination of a path may include activating edges or nodes and adding constraints to the selection of a path. Any appropriate constraints may be used, such as constraints relating to activating property nodes, constraints relating to activating component nodes, constraints relating to activating edges, and constraints to avoid cycles in the path.

A constraint for property nodes may include activating a property node if one or more of the edges leading to the property node are active. In some implementations, if there is a path that leads to the property node, then the property node may be activated. This constraint can be expressed as follows:

$$\text{Property node activation} <= \text{sum (edges leading to the property node)}$$

This constraint also allows the property node to be inactive when one or more of the leading edges are activated. When a leading edge is activated, a corresponding property node may be activated but need not be activated.

A constraint for component nodes may include activating a component node only if all the leading edges of the component are active. For example, a component node may only be activated if all of its inputs are available. For example, an API call may only be executed if all required inputs are available. Similar to the property nodes, component nodes may be inactive even if all the leading edges are active. For example, even if all the inputs for an API call are available, the API may not be needed to accomplish a task. This constraint may be expressed as follows:

$$\text{Component node activation} <= 1/n \times \text{sum (edges leading to the component node)}$$

In this constraint, n may be the number of edges leading to the component node. Where the activation is a binary variable, a component node may not be activated unless all the leading edges are active.

A constraint for the activation of edges may be that an edge may be active when the node before the edge is active. This constraint may be expressed as follows, $$\text{Edge activation} <= \text{Parent node activation}$$

As with the above constraints, an edge may be inactive even if the node before the edge is active.

A constraint for avoiding cycles in the graph may include an incrementing parameter. An incrementing parameter may be incremented when traversing to a next edge or node of the graph. The incrementing parameter for an edge or node may thus be higher than the edge or node that came before it. A constraint may include not allowing a path to traverse to an edge or node with an incrementing parameter that is less than the incrementing parameter of a current node or edge.

At step 970, implementation information is obtained for components of the component nodes of the first path. Any appropriate implementation information may be obtained, and the implementation information may be obtained using any appropriate techniques. In some implementations, component nodes of the graph may be associated with a component ID, and the component ID may be used to retrieve the implementation information for a component from a database using the component ID (such as the database of FIG. 5). The implementation information for a component may include, for example, one or more of a function name or address of a function that implements the component (or similarly for a method or a procedure), text of software corresponding to an implementation of the component, compiled binary software corresponding to an implementation of the component, or an identifier of one or more libraries or dependencies for implementing the component.

At step 980, first executable software is generated using the nodes of the first path and the implementation information for the components. Any appropriate techniques may be used to generate executable software. In some implementations, the software generated at step 980 may use a different programming language than the programming language used to create the components.

In some implementations, text of software may be generated that is similar to software that may be generated by a software developer. For example, a template may be used to create the text of the software, such as the template of FIG. 7. In generating the text of the software, the function names of components may be obtained from the implementation information and the inputs and outputs of the components may be obtained and connected using the property nodes of the graph. Any of the techniques described above for FIG. 7 and FIGS. 8A and B may be used to generate text of software. Where the template is for an interpreted programming language, the text of the software may itself be executable (possibly using other steps such as byte compilation). Where the template is for a compiled programming language, the text of the software may be compiled into executable binary software.

In some implementations, the executable software may be created using other techniques. For example, where the implementation information for a component includes text of software for implementing the component or compiled binary software for implementing a component, this implementation information may be combined (e.g., concatenated) to generate the executable software.

At step 990, the first executable software is executed. The first executable software may be used for any appropriate application. For example, the first executable software may be executed as part of presenting a web page to a user.

The method of FIG. 9 may be implemented for any number of task specifications. For example, a computer system may have several or a large number of task specifications corresponding to various operations of the computer system. In some implementations, steps 910 and 920 may be performed once for all tasks, and steps 930 to 980 may be implemented for each of the tasks. In some implementations, the method of FIG. 9 may be performed to generate the executable software in advance, and the executable software may be executed as needed. In some implementations, steps 930 to 980 may be implemented on demand so that executable software is generated each time that a task is performed.

In some implementations, a first company may implement the method of FIG. 9 as part of providing services to a second company. For example, the first company may receive information from the second company about tasks, components, and/or properties of a computer system operated by the second company. The first company may implement the method of FIG. 9 to generate executable software and then provide the executable software to the second company. The second company may then use the executable software to implement its computer system.

Figure 10:
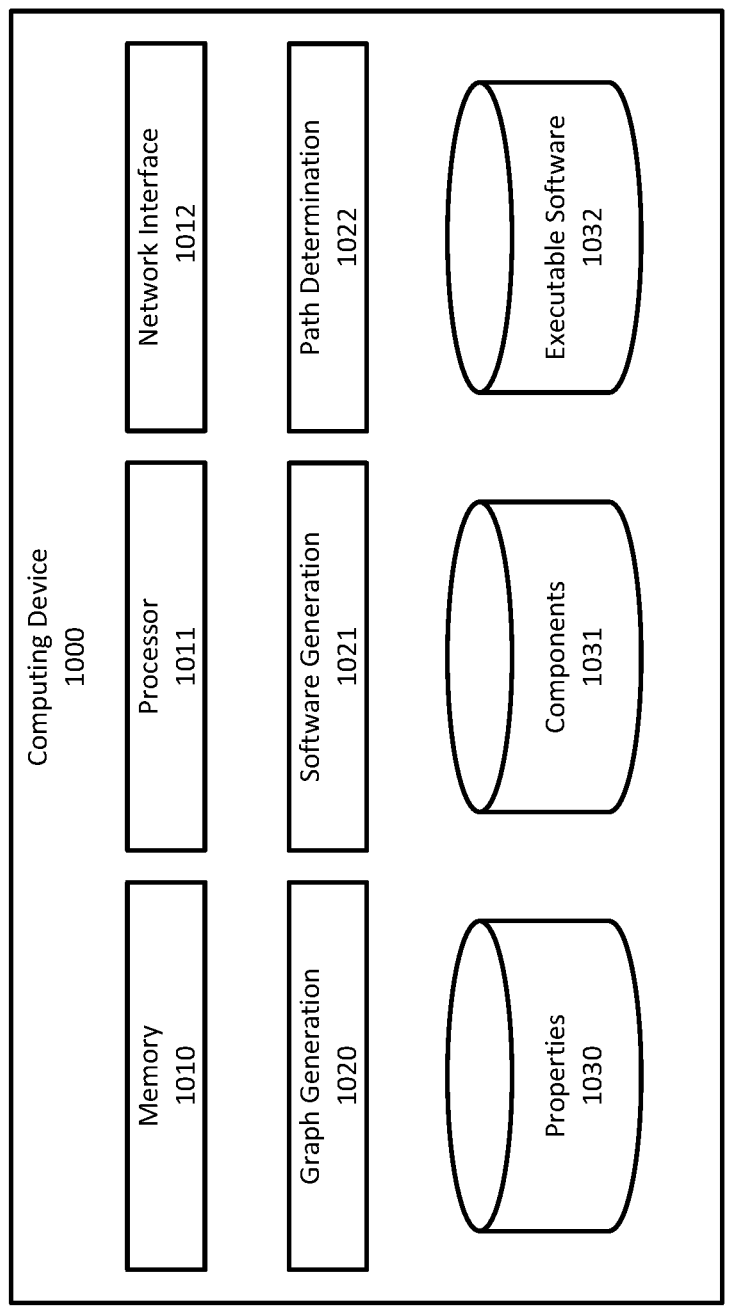
FIG. 10 is an exemplary computing device that may be used to generate executable software from a graph.

FIG. 10 illustrates components of an example computing device 1000 for implementing any of the techniques described above. In FIG. 10, the components are shown as being on a single computing device, but the components may be distributed among multiple computing devices, such as a system of computing devices, including, for example, an end-user computing device (e.g., a smart phone or a tablet) and/or a server computing device (e.g., cloud computing).

Computing device 1000 may include any components typical of a computing device, such as volatile or nonvolatile memory 1010, one or more processors 1011, and one or more network interfaces 1012. Computing device 1000 may also include any input and output components, such as displays, keyboards, and touch screens. Computing device 1000 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1000 may have a graph generation component 1020 that may generate a graph of properties and components using any of the techniques described herein. Computing device 1000 may have a software generation component 1021 that may generate executable software from a task specification and a graph using any of the techniques described herein. Computing device 1000 may have a path determination component 1022 that may determine a path from one or more input nodes to one or more output nodes using any of the techniques described herein.

Computing device 1000 may include or have access to various data stores. Data stores may use any known storage technology such as files, relational databases, non-relational databases, or any non-transitory computer-readable media. Computing device 1000 may have properties data store 1030 that may store properties that are available to the computing system. Computing device 1000 may have components data store 1031 that may store components that are used to generate executable software. Computing device 1000 may have executable software data store 1032 that may store executable software that has been automatically generated for use by software developers.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for generating executable software, the method comprising:
   determining a component graph by:
      obtaining information about a plurality of components, wherein each component includes one or more input properties and one or more output properties and wherein the plurality of components comprises at least one of:
         a first component that is configured to use a first input property to retrieve information from a database and wherein a first output property is the information retrieved from the database,
         a second component that is configured to use a second input property to generate an API call to a server computer and wherein a second output property is obtained from a response to the API call, or
         a third component that is configured to process a third input property to compute a third output property; and
      generating the graph using the plurality of components wherein the graph comprises component nodes corresponding to components of the plurality of components and property nodes corresponding to input properties and output properties of the plurality of components;
   obtaining a first task specification, wherein the first task specification comprises a first task input property and a first task output property;
   determining implementation information for the first task specification from the graph by:
      determining that the first task input property corresponds to a first property node of the graph;
      determining that the first task output property corresponds to a second property node of the graph;
      determining a first path from the first property node of the graph to the second property node of the graph by solving a Steiner tree problem using constrained optimization, wherein the first path is a subgraph of the graph; and
      obtaining the implementation information for components of the first path; and
   executing first executable software using nodes of the first path and the implementation information.

2. The computer-implemented method of claim 1, wherein there is a one-to-one correspondence between the plurality of components and the component nodes of the graph.

3. The computer-implemented method of claim 1, wherein the first task specification corresponds to presenting a value of the first task output property on a web page.

4. The computer-implemented method of claim 1, wherein the first task specification comprises a second task input property or a second task output property.

5. The computer-implemented method of claim 1, wherein one or more nodes or edges of the graph are associated with costs.

6. The computer-implemented method of claim 1, wherein determining the first path comprises computing a cost for the first path.

7. The computer-implemented method of claim 1, comprising:
   receiving a second task specification, wherein the second task specification comprises a second task input property and a second task output property;
   determining that the second task input property corresponds to a third property node of the graph;
   determining that the second task output property corresponds to a fourth property node of the graph;
   determining a second path from the third property node of the graph to the fourth property node of the graph; and
   generating second executable software using the second path.

8. The computer-implemented method of claim 1, wherein generating the graph comprises generating without user intervention.

9. The computer-implemented method of claim 1, wherein the first path includes a subset of nodes in the graph.

10. A system for generating executable software, the system comprising:
    at least one server computer comprising at least one processor and at least one memory, the at least one server computer configured to:
       determine a component graph by:
          obtaining information about a plurality of components, wherein each component includes one or more input properties and one or more output properties and wherein the plurality of components comprises:

a first component that is configured to use a first input property to retrieve information from a database and wherein a first output property is the information retrieved from the database, a second component that is configured to use a second input property to generate an API call to a second server computer and wherein a second output property is obtained from a response to the API call, and a third component that is configured to process a third input property to compute a third output property; and generating the graph using the plurality of components wherein the graph comprises component nodes corresponding to components of the plurality of components and property nodes corresponding to input properties and output properties of the plurality of components;

receive a first task specification, wherein the first task specification comprises a first task input property and a first task output property;

determine an implementation for the first task specification from the graph by:

determining that the first task input property corresponds to a first property node of the graph;

determining that the first task output property corresponds to a second property node of the graph; and determining a first path from the first property node of the graph to the second property node of the graph, wherein the first path is a subgraph of the graph; and execute first executable software using components of the first path.

11. The system of claim 10, wherein there is a one-to-one correspondence between properties and the property nodes of the graph.

12. The system of claim 10, wherein the at least one server computer is operated by a first company and the second server computer is operated by a second company.

13. The system of claim 12, wherein the first company assists the second company in providing customer service to customers of the second company.

14. The system of claim 10, wherein:
the at least one server computer is operated by a first company;
the first company receives the first task specification from a second company; and
the first company provides the first executable software to the second company or executes the first executable software on behalf of the second company.

15. The system of claim 10, wherein the at least one server computer is configured to determine the first path by determining a shortest path between the first property node and the second property node.

16. The system of claim 10, wherein the first executable software comprises compiled software or interpreted software.

17. The system of claim 10, wherein the at least one server computer is configured to generate the first executable software on demand.

18. One or more non-transitory, computer-readable media comprising computer-executable instructions that, when executed, cause at least one processor to perform actions comprising:

determining a component graph by:

obtaining information about a plurality of components, wherein each component includes one or more input properties and one or more output properties and wherein the plurality of components comprises at least one of:

a first component that is configured to use a first input property to retrieve information from a database and wherein a first output property is the information retrieved from the database, a second component that is configured to use a second input property to generate an API call to a server computer and wherein a second output property is obtained from a response to the API call, or a third component that is configured to process a third input property to compute a third output property; and generating the graph using the plurality of components wherein the graph comprises component nodes corresponding to components of the plurality of components and property nodes corresponding to input properties and output properties of the plurality of components;

receiving a first task specification, wherein the first task specification comprises a first task input property and a first task output property;

determining an implementation for the first task specification from the graph by:

determining that the first task input property corresponds to a first property node of the graph;

determining that the first task output property corresponds to a second property node of the graph; and determining a first path from the first property node of the graph to the second property node of the graph by solving a Steiner tree problem using constrained optimization, wherein the first path is a subgraph of the graph; and executing first executable software using components of the first path.

19. The one or more non-transitory, computer-readable media of claim 18, wherein the first component is associated with software written in a first programming language, the first executable software is written in a second programming language, and the first programming language is different from the second programming language.

20. The one or more non-transitory, computer-readable media of claim 18, wherein the third component is configured to process the third input property with a neural network.

21. The one or more non-transitory, computer-readable media of claim 18, wherein the graph is a directed graph.

* * * * *